United States Patent
Ozeki et al.

(10) Patent No.: US 9,206,894 B2
(45) Date of Patent: Dec. 8, 2015

(54) CONTROL DEVICE AND CONTROL METHOD FOR SPEED CHANGE DEVICE

(75) Inventors: Seiya Ozeki, Okazaki (JP); Taihwan Kim, Okazaki (JP); Jun Igarashi, Kariya (JP); Eiji Moriyama, Okazaki (JP); Hiroshi Tsutsui, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 150 days.

(21) Appl. No.: 13/983,931

(22) PCT Filed: Mar. 30, 2012

(86) PCT No.: PCT/JP2012/058657
§ 371 (c)(1),
(2), (4) Date: Aug. 6, 2013

(87) PCT Pub. No.: WO2012/133808
PCT Pub. Date: Oct. 4, 2012

(65) Prior Publication Data
US 2013/0317714 A1    Nov. 28, 2013

(30) Foreign Application Priority Data
Mar. 31, 2011    (JP) ................................. 2011-078182

(51) Int. Cl.
| | |
|---|---|
| *G06F 7/00* | (2006.01) |
| *G06F 17/00* | (2006.01) |
| *G06F 19/00* | (2011.01) |
| *F16H 59/68* | (2006.01) |
| *F16H 61/12* | (2010.01) |
| *F16H 61/686* | (2006.01) |

(52) U.S. Cl.
CPC .............. *F16H 59/68* (2013.01); *F16H 61/12* (2013.01); *F16H 61/686* (2013.01); *F16H 2061/1204* (2013.01)

(58) Field of Classification Search
CPC ....... F16H 61/12; F16H 61/686; F16H 59/68; F16H 2061/1204
USPC ........................................................ 701/62
See application file for complete search history.

(56) References Cited

U.S. PATENT DOCUMENTS

| | | | | |
|---|---|---|---|---|
| 4,393,732 A | * | 7/1983 | Suzuki et al. | 477/125 |
| 5,289,741 A | * | 3/1994 | Debs et al. | 475/123 |
| 5,905,309 A | * | 5/1999 | Ohmi et al. | 290/36 R |

(Continued)

FOREIGN PATENT DOCUMENTS

| | | |
|---|---|---|
| JP | A-2007-263187 | 10/2007 |
| JP | A-2009-79711 | 4/2009 |
| WO | WO 2009/084294 A1 | 7/2009 |

OTHER PUBLICATIONS

International Search Report issued in International Patent Application No. PCT/JP2012/058657 dated Jun. 5, 2012.

*Primary Examiner* — Calvin Cheung
*Assistant Examiner* — Paula L Schneider
(74) *Attorney, Agent, or Firm* — Oliff PLC

(57) ABSTRACT

One of two clutches etc. engaged concurrently with each other to establish a second speed, a third speed, or a fourth speed is determined in advance as an abnormal-time engagement element that is kept engaged when an abnormality occurs in which one different clutch or brake is engaged during concurrent engagement of the two clutches etc. The other of the two clutches etc. is determined in advance as an abnormal-time slipping element that is caused to slip when such an abnormality occurs. During concurrent engagement of the two clutches etc., a hydraulic pressure (target hydraulic pressure) to be supplied to the abnormal-time engagement element is set to be higher than a hydraulic pressure (target hydraulic pressure) to be supplied to the abnormal-time slipping element.

8 Claims, 10 Drawing Sheets

| | | ABNORMAL-TIME ENGAGEMENT ELEMENT | ABNORMAL-TIME SLIPPING ELEMENT |
|---|---|---|---|
| | 1st | — | — |
| | 2nd | C-1, B-1 | C-5 |
| | 3rd | C-1, C-6 | B-1 |
| | 4th | C-1, C-6 | C-3 |
| D | 5th | C-1, C-6 | C-4 |
| | 6th | C-2, C-6 | C-1 |
| | 7th | C-2, C-6 | C-4 |
| | OD1 | C-2, C-3 | C-6 |
| | OD2 | C-2, C-5 | C-3 |
| | OD3 | C-2, C-5 | B-1 |

(56) References Cited

U.S. PATENT DOCUMENTS

| | | | |
|---|---|---|---|
| 6,385,837 B1* | 5/2002 | Murakami et al. | 29/407.02 |
| 2006/0270515 A1* | 11/2006 | Kobayashi et al. | 475/275 |
| 2007/0015624 A1* | 1/2007 | Ota et al. | 477/34 |
| 2008/0183359 A1* | 7/2008 | Sawada | 701/54 |
| 2009/0171544 A1* | 7/2009 | Tanaka et al. | 701/55 |
| 2009/0171545 A1 | 7/2009 | Shimizu et al. | |

* cited by examiner

F I G . 1
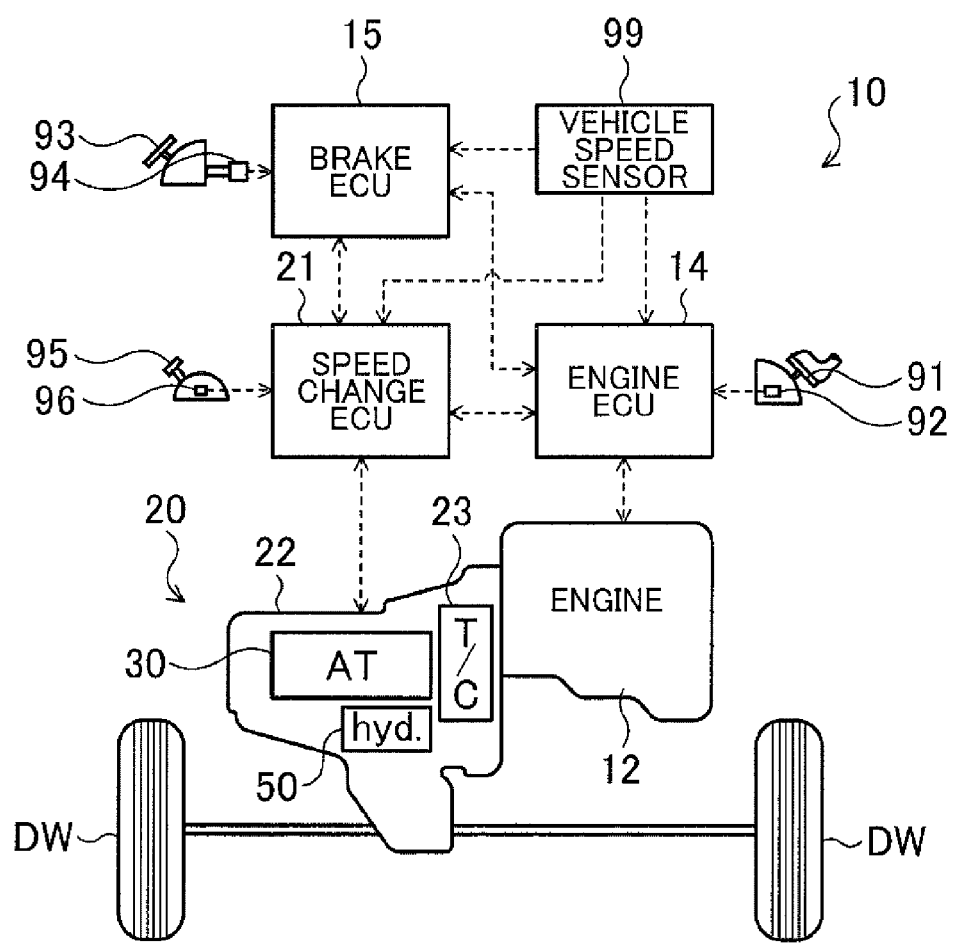

FIG.3

|  | C-1 | C-2 | C-3 | B-1 | B-3 | F-2 |
|---|---|---|---|---|---|---|
| P |  |  |  |  |  |  |
| REV |  |  | ○ |  | ○ |  |
| N |  |  |  |  |  |  |
| D 1st | ○ |  |  |  | ● | ○ |
| D 2nd | ○ |  |  | ○ |  |  |
| D 3rd | ○ | ○ |  |  |  |  |
| D 4th |  | ○ |  | ○ |  |  |

※ ○: ENGAGED, ●: ENGAGED WITH ENGINE BRAKE IN OPERATION

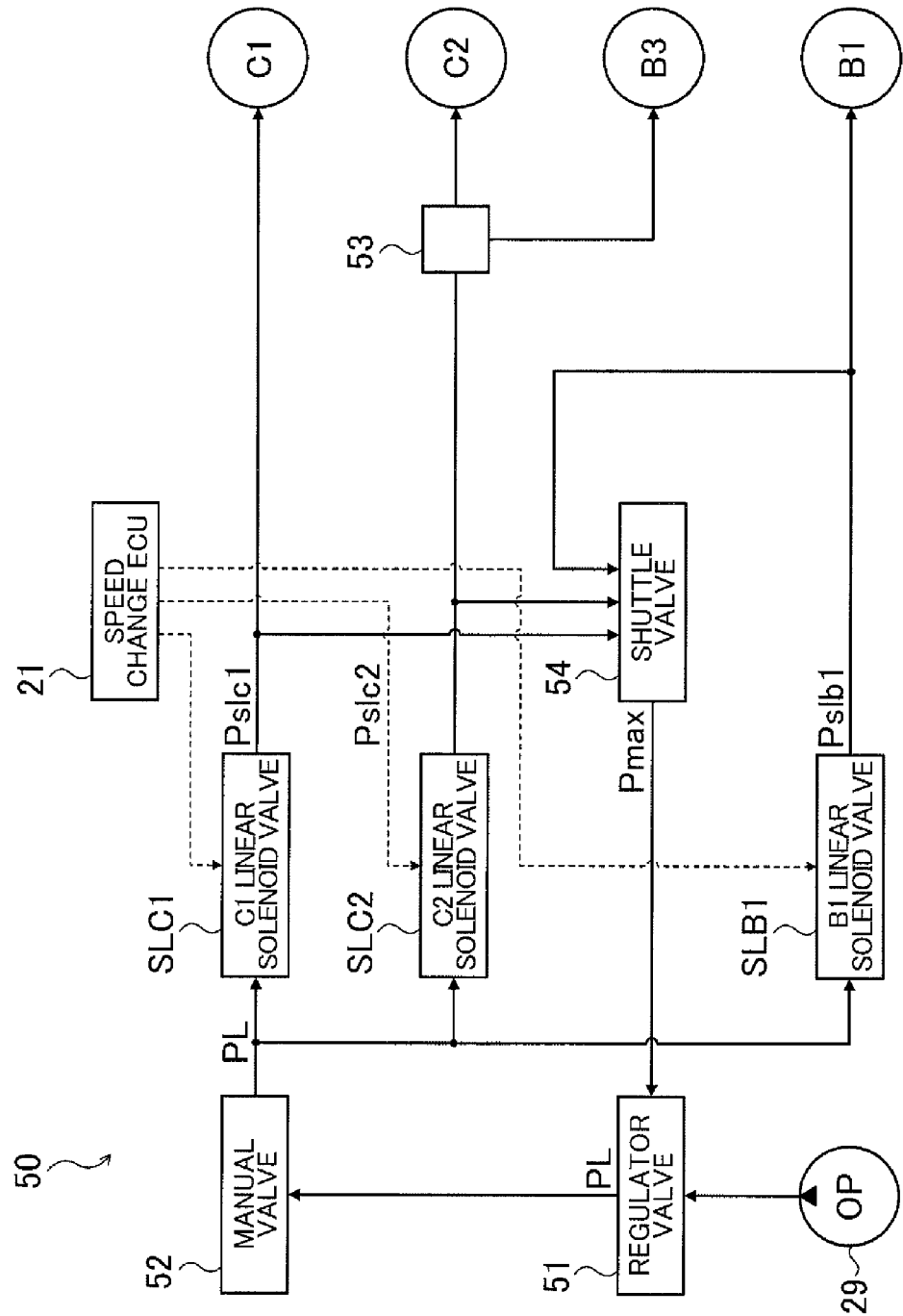
F I G . 5

FIG. 6

```
HYDRAULIC PRESSURE CONTROL ROUTINE
          │
INPUT CURRENT SHIFT SPEED γ AND      ─ S100
ENGINE TORQUE Te
          │
ACQUIRE TORQUE DISTRIBUTION RATIOS   ─ S110
          │
CALCULATE DISTRIBUTED TORQUES        ─ S120
          │
DECIDE ABNORMAL-TIME ENGAGEMENT ELEMENT  ─ S130
AND ABNORMAL-TIME SLIPPING ELEMENT
          │
SET TARGET HYDRAULIC PRESSURE FOR    ─ S140
ABNORMAL-TIME SLIPPING ELEMENT
          │
SET TARGET HYDRAULIC PRESSURE FOR    ─ S150
ABNORMAL-TIME ENGAGEMENT ELEMENT
          │
LINEAR SOLENOID VALVE CONTROL        ─ S160
          │
        RETURN
```

FIG. 7

|   |     | C-1  | C-2  | C-3  | B-1  | B-3    | F-2  |
|---|-----|------|------|------|------|--------|------|
| D | 1st | R1c1 |      |      |      | (R1b3) | R1f2 |
|   | 2nd | R2c1 |      |      | R2b1 |        |      |
|   | 3rd | R3c1 | R3c2 |      |      |        |      |
|   | 4th |      | R4c2 |      | R4b1 |        |      |
|   | REV |      |      | Rrc3 |      | Rrb3   |      |

( ): WITH ENGINE BRAKE IN OPERATION

|   |     | C-1 | C-2 | C-3 | C-4 | C-5 | C-6 | B-1 | B-2 | F-1 |
|---|-----|-----|-----|-----|-----|-----|-----|-----|-----|-----|
| D | 1st | O   |     |     |     | O   |     |     | ●   | O   |
|   | 2nd | O   |     |     |     | O   |     | O   |     |     |
|   | 3rd | O   |     |     |     |     | O   | O   |     |     |
|   | 4th | O   |     | O   |     |     | O   |     |     |     |
|   | 5th | O   |     |     | O   |     | O   |     |     |     |
|   | 6th | O   | O   |     |     |     | O   |     |     |     |
|   | 7th |     | O   |     | O   |     | O   |     |     |     |
|   | OD1 |     | O   | O   |     |     | O   |     |     |     |
|   | OD2 |     | O   | O   |     | O   |     |     |     |     |
|   | OD3 |     | O   |     |     | (O) |     | O   |     |     |
| R | Rev1|     |     | O   |     | O   |     |     | O   |     |
|   | Rev2|     |     | O   |     |     | O   |     | O   |     |
|   | Rev3|     |     |     | O   | O   |     |     | O   |     |
|   | Rev4|     |     |     | O   |     | O   |     | O   |     |

O: ENGAGED, ●: ENGAGED WITH ENGINE BRAKE IN OPERATION,
(O): SUPPLIED WITH HYDRAULIC PRESSURE BUT TRANSFERRING NO TORQUE

F I G . 12

| | | ABNORMAL-TIME ENGAGEMENT ELEMENT | ABNORMAL-TIME SLIPPING ELEMENT |
|---|---|---|---|
| D | 1st | — | — |
| | 2nd | C-1, B-1 | C-5 |
| | 3rd | C-1, C-6 | B-1 |
| | 4th | C-1, C-6 | C-3 |
| | 5th | C-1, C-6 | C-4 |
| | 6th | C-2, C-6 | C-1 |
| | 7th | C-2, C-6 | C-4 |
| | OD1 | C-2, C-3 | C-6 |
| | OD2 | C-2, C-5 | C-3 |
| | OD3 | C-2, C-5 | B-1 |

CONTROL DEVICE AND CONTROL METHOD FOR SPEED CHANGE DEVICE

INCORPORATION BY REFERENCE

The disclosure of Japanese Patent Application No. 2011-078182 filed on Mar. 31, 2011 including the specification, drawings and abstract is incorporated herein by reference in its entirety.

BACKGROUND OF THE INVENTION

The present invention relates to a control device and a control method for a speed change device including at least three or more friction engagement elements and capable of establishing a plurality of shift speeds by engaging two or more of the three or more friction engagement elements concurrently with each other.

DESCRIPTION OF THE RELATED ART

Hitherto, there has been known a control device for a speed change device that calculates transfer torque transferred by two friction engagement elements engaged concurrently with each other on the basis of input torque input to an input shaft and respective torque distribution ratios of the two friction engagement elements, and that sets respective hydraulic pressures to be supplied to the two friction engagement elements such that respective torque capacities of the two friction engagement elements are obtained by adding a safety factor to the transfer torque such that the two friction engagement elements are not caused to slip (see International Patent Application Publication No. 2009/084294, for example). In the speed change device, when an abnormality occurs in which a different friction engagement element is engaged during concurrent engagement of the two friction engagement elements, the respective torque distribution ratios of the three friction engagement elements are varied, and one of the three friction engagement elements becomes less than limit torque. Consequently, the one friction engagement element is caused to slip, which allows establishment of one of a plurality of shift speeds to enable the speed change device to continuously transfer power. Japanese Patent Application Publication No. 2009-079711 (JP 2009-079711 A) describes a known example of a speed change device including a plurality of (three or more) friction engagement elements and capable of establishing a plurality of shift speeds by engaging three of the plurality of friction engagement elements concurrently with each other.

SUMMARY OF THE INVENTION

In the case where the respective hydraulic pressures to be supplied to the two friction engagement elements engaged concurrently with each other are set on the basis of the transfer torque based on the input torque and the respective torque distribution ratios of the two friction engagement elements and the safety factor for not causing slipping as in the speed change device according to the related art described above, however, it is unknown which of the three friction engagement elements is caused to slip when an abnormality occurs in which a different friction engagement element is engaged during concurrent engagement of the two friction engagement elements. Therefore, in the speed change device according to the related art, a shift speed established when an abnormality occurs may be inadequate depending on the friction engagement element which is caused to slip along with occurrence of the abnormality described above.

Thus, it is a main object of the present invention to bring a speed change device into a more adequate state when an abnormality occurs in which at least one friction engagement element other than two or more friction engagement elements is engaged during concurrent engagement of the two or more friction engagement elements.

In order to achieve the foregoing main object, the control device and the control method for a speed change device according to the present invention adopt the following means.

According to a first aspect of the present invention, a control device for a speed change device, which includes a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, includes: a decision unit that determines a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs; and a target hydraulic pressure setting unit that sets respective target hydraulic pressures for pressure regulation valves corresponding to the two or more friction engagement elements on the basis of input torque for the speed change mechanism and a torque distribution ratio determined in advance such that the two or more friction engagement elements are not caused to slip with the shift speed established through engagement of the two or more friction engagement elements and such that the abnormal-time engagement element is caused to slip when the abnormality occurs. The decision unit decides the abnormal-time engagement element and the abnormal-time slipping element so as to establish a shift speed that is higher than the shift speed established through concurrent engagement of the two or more friction engagement elements.

The control device for a speed change device is intended to control a speed change device including three or more (M) friction engagement elements. The control device decides a part ($n: 1 \leq n \leq N-1$) of two or more ($N: 2 \leq N \leq M$) friction engagement elements engaged concurrently with each other to establish a shift speed as an abnormal-time engagement element, and decides the remainder ($n': 1 \leq n' \leq N-n$) of the two or more friction engagement elements as an abnormal-time slipping element. The abnormal-time engagement element is kept engaged when an abnormality occurs in which at least one ($m: 1 \leq m \leq M-N$) friction engagement element other than the two or more friction engagement elements is engaged during concurrent engagement of the two or more friction engagement elements. The abnormal-time slipping element is caused to slip when such an abnormality occurs. The control device sets respective target hydraulic pressures for pressure regulation valves corresponding to the two or more friction engagement elements engaged concurrently with each other such that the two or more friction engagement elements are not caused to slip with the shift speed established through engagement of the two or more friction engagement elements and such that the abnormal-time engagement element is caused to slip when the abnormality occurs. Consequently, the abnormal-time slipping element can be quickly caused to slip and the abnormal-time engagement element can be more reliably kept engaged when an abnormality occurs in which at least one friction engagement element other than the two or more friction engagement elements is engaged during concurrent engagement of the two or more friction engagement elements. Thus, it is possible to more reliably establish a shift speed through concurrent engagement of the abnormal-time engagement element and the at least one friction engagement element other than the two or more friction engagement elements after the abnormality described above occurs. Thus, according to the first aspect of the present invention, it is possible to bring a speed change device into a more adequate state when an abnormality occurs in which at least one friction engagement element other than two or more friction engagement elements is engaged during concurrent engagement of the two or more friction engagement elements. Then, by deciding the abnormal-time engagement element and the abnormal-time slipping element such that a shift speed that is higher than the shift speed established through concurrent engagement of the two or more friction engagement elements as done by the control device, it is possible to suppress occurrence of a downshift, that is, output of braking torque to an output member of the speed change device, when the abnormality described above occurs, thereby favorably suppressing an abrupt increase in rotational speed of a motor coupled to the speed change device.

In addition, the decision unit may decide the abnormal-time engagement element and the abnormal-time slipping element such that a shift speed that is one speed higher than the shift speed established through concurrent engagement of the two or more friction engagement elements is established by the abnormal-time engagement element and at least one friction engagement element other than the two or more friction engagement elements when the abnormality occurs. Consequently, it is possible to favorably suppress an abrupt increase in rotational speed of the motor coupled to the speed change device by not allowing a change in shift speed toward the lower speed side (downshift side) when the abnormality described above occurs.

Further, the decision unit may decide the abnormal-time engagement element and the abnormal-time slipping element such that a shift speed that is one speed lower than a highest shift speed is established by the abnormal-time engagement element and at least one friction engagement element other than the two or more friction engagement elements when the abnormality occurs with the highest shift speed established through concurrent engagement of the two or more friction engagement elements. Consequently, it is possible to suppress an abrupt increase in rotational speed of the motor coupled to the speed change device by not allowing a change in shift speed further toward the lower speed side (downshift side), that is, to a shift speed that is two speeds or more lower, when the abnormality described above occurs.

Moreover, the target hydraulic pressure setting unit may set respective target hydraulic pressures for the pressure regulation valves corresponding to the two or more friction engagement elements such that the abnormal-time slipping element is supplied with a hydraulic pressure matching distributed torque based on the input torque and a torque distribution ratio for the abnormal-time slipping element determined in advance in accordance with the shift speed, and such that the abnormal-time engagement element is supplied with a hydraulic pressure obtained by raising on the basis of the distributed torque for the abnormal-time slipping element a hydraulic pressure matching distributed torque based on the input torque and a torque distribution ratio for the abnormal-time engagement element determined in advance in accordance with the shift speed. Consequently, it is possible to more adequately set the respective hydraulic pressures to be supplied to the two or more friction engagement elements, that is, the abnormal-time engagement element and the abnormal-time slipping element, during concurrent engagement of the two or more friction engagement elements.

According to a second aspect of the present invention, a control device for a speed change device, which includes a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, includes: a decision unit that determines a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs; and a target hydraulic pressure setting unit that sets respective target hydraulic pressures for pressure regulation valves corresponding to the two or more friction engagement elements on the basis of input torque for the speed change mechanism and a torque distribution ratio determined in advance such that the two or more friction engagement elements are not caused to slip with the shift speed established through engagement of the two or more friction engagement elements and such that the abnormal-time engagement element is caused to slip when the abnormality occurs. The decision unit decides the abnormal-time engagement element and the abnormal-time slipping element so as not to establish a shift speed that is a predetermined number of shift speeds or more lower than the shift speed established through concurrent engagement of the two or more friction engagement elements.

The control device for a speed change device is intended to control a speed change device including three or more (M) friction engagement elements. The control device decides a part ($n: 1 \leq n \leq N-1$) of two or more ($N: 2 \leq N \leq M$) friction engagement elements engaged concurrently with each other to establish a shift speed as an abnormal-time engagement element, and decides the remainder ($n': 1 \leq n' \leq N-n$) of the two or more friction engagement elements as an abnormal-time slipping element. The abnormal-time engagement element is kept engaged when an abnormality occurs in which at least one ($m: 1 \leq m \leq M-N$) friction engagement element other than the two or more friction engagement elements is engaged during concurrent engagement of the two or more friction engagement elements. The abnormal-time slipping element is caused to slip when such an abnormality occurs. The control device sets respective target hydraulic pressures for pressure regulation valves corresponding to the two or more friction engagement elements engaged concurrently with each other on the basis of input torque for the speed change mechanism and a torque distribution ratio determined in advance such that the two or more friction engagement elements are not caused to slip with the shift speed established through engagement of the two or more friction engagement elements and such that the abnormal-time engagement element is caused to slip when the abnormality occurs. Consequently, the abnormal-time slipping element can be quickly caused to slip and the abnormal-time engagement element can be more reliably kept engaged when an abnormality occurs in which at least one friction engagement element other than the two or more friction engagement elements is engaged during concurrent engagement of the two or more friction engagement elements. Thus, it is possible to more reliably establish a shift speed through concurrent engagement of the abnormal-time engagement element and the at least one friction engagement element other than the two or more friction engagement elements after the abnormality described above occurs. Thus, according to the second aspect of the present invention, it is possible to bring a speed change device into a more adequate state when an abnormality occurs in which at least one friction engagement element other than two or more friction engagement elements is engaged during concurrent engagement of the two or more friction engagement elements. Then, by deciding the abnormal-time engagement element and the abnormal-time slipping element such that a shift speed that is a predetermined number of shift speeds or more lower than the shift speed established through concurrent engagement of the two or more friction engagement elements is not established as done by the control device, it is possible to suppress occurrence of a steep downshift such as that from a fourth speed to a second speed or from a sixth speed to the fourth speed, for example, that is, output of high braking torque to an output member of the speed change device, when the abnormality described above occurs, thereby favorably suppressing an abrupt increase in rotational speed of a motor coupled to the speed change device.

In addition, the decision unit may decide the abnormal-time engagement element and the abnormal-time slipping element such that a shift speed that is higher than the shift speed established through concurrent engagement of the two or more friction engagement elements is established by the abnormal-time engagement element and at least one friction engagement element other than the two or more friction engagement elements when the abnormality occurs. Consequently, it is possible to favorably suppress an abrupt increase in rotational speed of the motor coupled to the speed change device by not allowing a change in shift speed toward the lower speed side (downshift side) when the abnormality described above occurs.

Further, the decision unit may decide the abnormal-time engagement element and the abnormal-time slipping element such that a shift speed that is one speed lower than a highest shift speed is established by the abnormal-time engagement element and at least one friction engagement element other than the two or more friction engagement elements when the abnormality occurs with the highest shift speed established through concurrent engagement of the two or more friction engagement elements. Consequently, it is possible to suppress an abrupt increase in rotational speed of the motor coupled to the speed change device by not allowing a change in shift speed further toward the lower speed side (downshift side), that is, to a shift speed that is two speeds or more lower, when the abnormality described above occurs.

Moreover, the target hydraulic pressure setting unit may set respective target hydraulic pressures for the pressure regulation valves corresponding to the two or more friction engagement elements such that the abnormal-time slipping element is supplied with a hydraulic pressure matching distributed torque based on the input torque and a torque distribution ratio for the abnormal-time slipping element determined in advance in accordance with the shift speed, and such that the abnormal-time engagement element is supplied with a hydraulic pressure obtained by raising on the basis of the distributed torque for the abnormal-time slipping element a hydraulic pressure matching distributed torque based on the input torque and a torque distribution ratio for the abnormal-time engagement element determined in advance in accordance with the shift speed. Consequently, it is possible to more adequately set the respective hydraulic pressures to be supplied to the two or more friction engagement elements, that is, the abnormal-time engagement element and the abnormal-time slipping element, during concurrent engagement of the two or more friction engagement elements.

According to a third aspect of the present invention, a control method for a speed change device, which includes a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, includes: a step (a) of determining a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs; and a step (b) of setting respective target hydraulic pressures for pressure regulation valves corresponding to the two or more friction engagement elements on the basis of input torque for the speed change mechanism and a torque distribution ratio determined in advance such that the two or more friction engagement elements are not caused to slip and such that a hydraulic pressure to be supplied to the abnormal-time engagement element is higher than a hydraulic pressure to be supplied to the abnormal-time slipping element. The step (a) includes deciding the abnormal-time engagement element and the abnormal-time slipping element so as to establish a shift speed that is higher than the shift speed established through concurrent engagement of the two or more friction engagement elements.

According to the method, it is possible to bring a speed change device into a more adequate state when an abnormality occurs in which at least one friction engagement element other than two or more friction engagement elements is engaged during concurrent engagement of the two or more friction engagement elements. Then, by deciding the abnormal-time engagement element and the abnormal-time slipping element such that a shift speed that is higher than the shift speed established through concurrent engagement of the two or more friction engagement elements as in the method, it is possible to suppress occurrence of a downshift, that is, output of braking torque to an output member of the speed change device, when the abnormality described above occurs, thereby favorably suppressing an abrupt increase in rotational speed of a motor coupled to the speed change device.

According to a fourth aspect of the present invention, a control method for a speed change device, which includes a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, includes: a step (a) of determining a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs; and a step (b) of setting respective target hydraulic pressures for pressure regulation valves corresponding to the two or more friction engagement elements on the basis of input torque for the speed change mechanism and a torque distribution ratio determined in advance such that the two or more friction engagement elements are not caused to slip and such that a hydraulic pressure to be supplied to the abnormal-time engagement element is higher than a hydraulic pressure to be supplied to the abnormal-time slipping element. The step (a) includes deciding the abnormal-time engagement element and the abnormal-time slipping element so as not to establish a shift speed that is a predetermined number of shift speeds or more lower than the shift speed established through concurrent engagement of the two or more friction engagement elements.

According to the method, it is possible to bring a speed change device into a more adequate state when an abnormality occurs in which at least one friction engagement element other than two or more friction engagement elements is engaged during concurrent engagement of the two or more friction engagement elements. Then, by deciding the abnormal-time engagement element and the abnormal-time slipping element such that a shift speed that is a predetermined number of shift speeds or more lower than the shift speed established through concurrent engagement of the two or more friction engagement elements is not established as in the method, it is possible to suppress occurrence of a steep downshift such as that from a fourth speed to a second speed or from a sixth speed to the fourth speed, for example, that is, output of braking torque to an output member of the speed change device, when the abnormality described above occurs, thereby favorably suppressing an abrupt increase in rotational speed of a motor coupled to the speed change device.

BRIEF DESCRIPTION OF THE DRAWINGS

FIG. 1 shows a schematic configuration of an automobile 10 which is a vehicle incorporating a power transfer device 20 including an automatic transmission 30 controlled by a control device for a speed change device according to an embodiment of the present invention;

FIG. 3 is an operation table showing the relationship between each shift speed of the automatic transmission 30 and the respective operating states of clutches and brakes;

FIG. 5 is a system diagram showing the hydraulic control device 50 of the power transfer device 20;

FIG. 6 is a flowchart showing an example of a hydraulic pressure control routine executed by a speed change ECU 21 of the power transfer device 20;

FIG. 7 shows an example of a torque distribution ratio map;

FIG. 12 is a table illustrating the abnormal-time engagement element and the abnormal-time slipping element at each shift speed of the automatic transmission 110.

DETAILED DESCRIPTION OF THE EMBODIMENTS

Now, an embodiment of the present invention will be described below.

Figure 2:
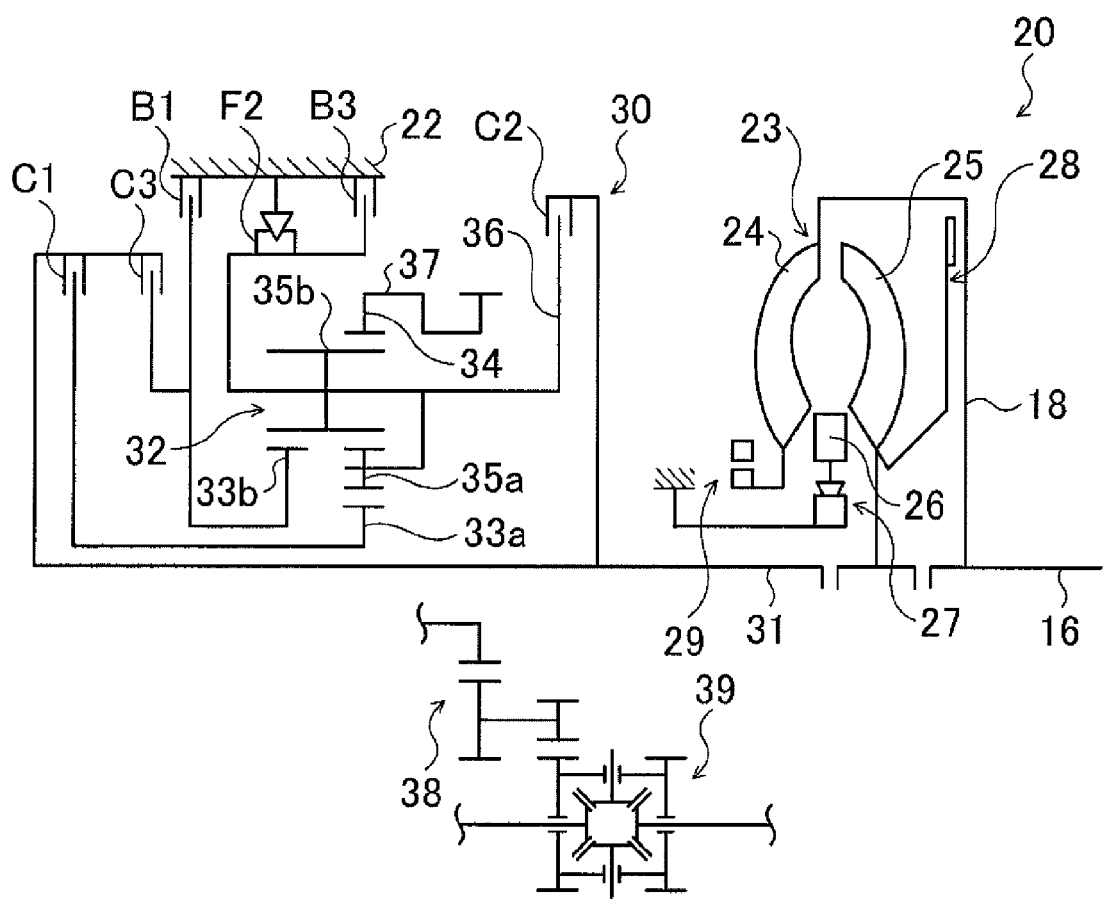
FIG. 2 shows a schematic configuration of the power transfer device 20.

FIG. 1 shows a schematic configuration of an automobile 10 which is a vehicle incorporating a power transfer device 20 including an automatic transmission 30 which is a speed change device according to an embodiment of the present invention. FIG. 2 shows a schematic configuration of the power transfer device 20. The automobile 10 shown in FIG. 1 includes an engine 12 serving as a motor which is an internal combustion engine that outputs power through explosive combustion of a mixture of a hydrocarbon fuel, such as gasoline and light oil, and air, an engine electronic control unit (hereinafter referred to as an "engine ECU") 14 that controls the engine 12, a brake electronic control unit (hereinafter referred to as a "brake ECU") 15 that controls an electronically controlled hydraulic brake unit (not shown), and the power transfer device 20 which includes a fluid transmission apparatus (starting device) 23, the automatic transmission 30 which is a stepped speed change mechanism, the hydraulic control device 50 which supplies and discharges hydraulic oil (a hydraulic fluid) to and from the fluid transmission apparatus 23 and the automatic transmission 30, a speed change electronic control unit (hereinafter referred to as a "speed change ECU") 21 that controls the fluid transmission apparatus 23, the automatic transmission 30, and the hydraulic unit 50, and so forth. The power transfer device 20 is connected to a crankshaft 16 of the engine 12 to transfer power from the engine 12 to left and right drive wheels DW. Each of the engine ECU 14, the brake ECU 15, and the speed change ECU 21 is formed as a microcomputer including a CPU (not shown) as a main component, and includes a ROM that stores various programs, a RAM that temporarily stores data, input and output ports and a communication port (not shown), and so forth besides the CPU. Moreover, the engine ECU 14, the brake ECU 15, and the speed change ECU 21 are connected to each other via a bus line or the like so that data required for control are exchanged between the ECUs as required.

The engine ECU 14 receives inputs such as an accelerator operation amount Acc from an accelerator pedal position sensor 92 that detects the amount of depression (amount of operation) of an accelerator pedal 91, a vehicle speed V from a vehicle speed sensor 99, signals from various sensors such as a crankshaft position sensor (not shown) that detects rotation of the crankshaft 16, and signals from the brake ECU 15 and the speed change ECU 21. The engine ECU 14 controls an electronically controlled throttle valve, a fuel injection valve, an ignition plug, and so forth (none of which is shown) on the basis of the received signals. The brake ECU 15 receives inputs such as a master cylinder pressure detected by a master cylinder pressure sensor 94 when a brake pedal 93 is depressed, the vehicle speed V from the vehicle speed sensor 99, signals from various sensors (not shown), and signals from the engine ECU 14 and the speed change ECU 21. The brake ECU 15 controls a brake actuator (hydraulic actuator) (not shown) on the basis of the received signals. The speed change ECU 21 of the power transfer device 20 is housed inside a transmission case 22. The speed change ECU 21 receives inputs such as a shift range SR from a shift range sensor 96 that detects the operation position of a shift lever 95 used to select a desired shift range from a plurality of shift ranges, the vehicle speed V from the vehicle speed sensor 99, signals from various sensors (not shown), and signals from the engine ECU 14 and the speed change ECU 15. The speed change ECU 21 controls the fluid transmission apparatus 23, the automatic transmission 30, and so forth on the basis of the received signals.

The power transfer device 20 includes the fluid transmission apparatus 23 housed inside the transmission case 22, an oil pump 29 serving as a hydraulic pressure generation source, the automatic transmission 30, and so forth. The fluid transmission device 23 is formed as a fluidic torque converter with a lock-up clutch. As shown in FIG. 2, the fluid transmission device 23 includes a pump impeller 24 connected to the crankshaft 16 of the engine 12 via a front cover 18, a turbine runner 25 fixed to an input shaft (power input member) 31 of the automatic transmission 30 via a turbine hub, a stator 26 disposed inside the pump impeller 24 and the turbine runner 25 to rectify the flow of hydraulic oil (ATF) from the turbine runner 25 to the pump impeller 24, a one-way clutch 27 that restricts rotation of the stator 26 to one direction, a lock-up clutch 28 having a damper mechanism (not shown), and so forth. The fluid transmission apparatus 23 functions as a torque amplifier through the action of the stator 26 when the difference in rotational speed between the pump impeller 24 and the turbine runner 25 is large, and functions as a fluid coupling when the difference in rotational speed between the pump impeller 24 and the turbine runner 25 is small. The lock-up clutch 28 can establish and release lock-up in which the front cover 18 and the input shaft 31 of the automatic transmission 30 are directly coupled to each other. If predetermined lock-up on conditions are met after the automobile 10 is started, the lock-up clutch 28 directly couples (locks up) the front cover 18 and the input shaft 31 of the automatic transmission 30 to each other so that power from the engine 12 is mechanically and directly transferred to the input shaft 31. In this event, variations in torque to be transferred to the input shaft 31 are absorbed by the damper mechanism (not shown).

The oil pump 29 serving as a hydraulic pressure generation source is formed as a gear pump including a pump assembly including a pump body and a pump cover, and an externally toothed gear connected via a hub to the pump impeller 24 of the fluid transmission apparatus 23, and connected to the hydraulic control device 50. When the engine 12 is in operation, power from the engine 12 rotates the externally toothed gear, which causes the oil pump 29 to suck and discharge hydraulic oil reserved in an oil pan via a strainer (both not shown). Thus, during operation of the engine 12, the oil pump 29 can generate a hydraulic pressure required by the fluid transmission apparatus 23 or the automatic transmission 30, and supply hydraulic oil to portions to be lubricated such as various bearings.

The automatic transmission 30 is formed as a 4-speed transmission. As shown in FIG. 2, the automatic transmission 30 includes a Ravigneaux type planetary gear device 32 and a plurality of hydraulic friction engagement elements, namely clutches C1, C2, and C3, two brakes B1 and B3, and a one-way clutch F2, that change a power transfer path from the input side to the output side. The Ravigneaux type planetary gear mechanism 32 includes two sun gears 33a and 33b which are each an externally toothed gear, a ring gear 34 which is an internally toothed gear held stationary with respect to an output shaft (power output member) 37 of the automatic transmission 30, a plurality of short pinion gears 35a meshed with the sun gear 33a, a plurality of long pinion gears 35b meshed with the sun gear 33b and the plurality of short pinion gears 35a and meshed with the ring gear 34, and a carrier 36 that holds the plurality of short pinion gears 35a and the plurality of long pinion gears 35b, which are coupled to each other, so as to be rotatable about their respective axes and revolvable around a common axis and that is supported by the transmission case 22 via the one-way clutch F2. The output shaft 37 of the automatic transmission 30 is connected to the drive wheels DW via a gear mechanism 38 and a differential mechanism 39.

Figure 4:
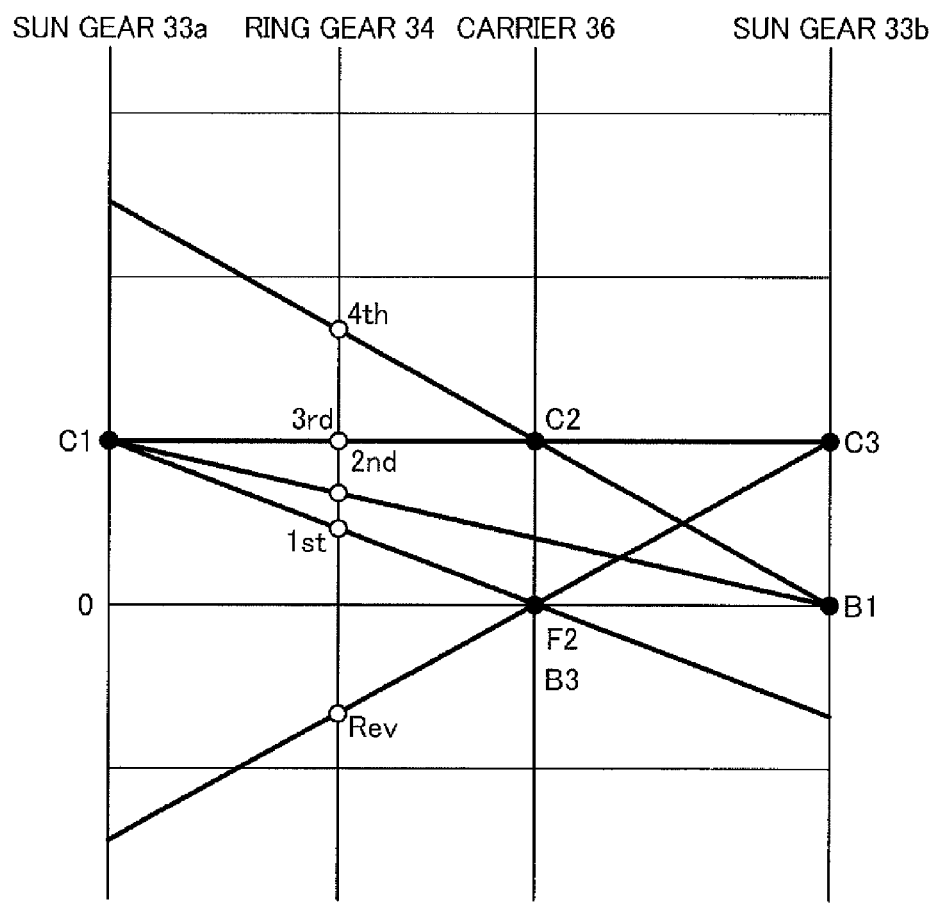
FIG. 4 is a collinear diagram illustrating the relationship between the respective rotational speeds of rotary elements foaming the automatic transmission 30.

The clutch C1 is a hydraulic clutch capable of engaging and disengaging the input shaft 31 and the sun gear 33a of the Ravigneaux type planetary gear device 32 with and from each other. The clutch C2 is a hydraulic clutch capable of coupling and uncoupling the input shaft 31 and the carrier 36 of the Ravigneaux type planetary gear device 32 with and from each other. The clutch C3 is a hydraulic clutch capable of coupling and uncoupling the input shaft 31 and the sun gear 33b of the Ravigneaux type planetary gear device 32 with and from each other. The brake B1 is a hydraulic brake capable of making the sun gear 33b of the Ravigneaux type planetary gear device 32 stationary and movable with respect to the transmission case 22. The brake B3 is a hydraulic brake capable of making the carrier 36 of the Ravigneaux type planetary gear device 32 stationary and movable with respect to the transmission case 22. The clutches C1 to C3 and the brakes B1 and B3 operate with hydraulic oil supplied thereto and discharged therefrom by the hydraulic control device 50. FIG. 3 is an operation table showing the relationship between each shift speed of the automatic transmission 30 and the respective operating states of the clutches C1 to C3, the brakes B1 and B3, and the one-way clutch F2. FIG. 4 is a collinear diagram illustrating the relationship between the respective rotational speeds of rotary elements forming the automatic transmission 30. The automatic transmission 30 provides first to fourth forward shift speeds and one reverse shift speed when the clutches C1 to C3 and the brakes B1 and B3 are brought into respective states shown in the operation table of FIG. 3.

FIG. 5 is a system diagram showing the hydraulic control device 50 which supplies and discharges hydraulic oil to and from the fluid transmission apparatus 23 including the lock-up clutch 28 discussed above and the automatic transmission 30. The hydraulic control device 50 is connected to the oil pump 29 discussed above which is driven by power from the engine 12 to suck and discharge hydraulic oil from the oil pan. As shown in FIG. 5, the hydraulic control device 50 includes a primary regulator valve 51 that regulates the hydraulic oil discharged from the oil pump 29 to a hydraulic pressure necessary for the fluid transmission apparatus 23 and the automatic transmission 30 (a starting device and a speed change mechanism) to generate a line pressure (source pressure) PL, a manual valve 52 that switches the supply destination of the line pressure PL from the primary regulator valve 51 in accordance with the operating position of the shift lever 95, a C1 linear solenoid valve (pressure regulation valve) SLC1 that regulates the line pressure PL from the manual valve 52 (primary regulator valve 51) to generate a C1 solenoid pressure Pslc1 for the clutch C1, a C2 linear solenoid valve (pressure regulation valve) SLC2 that regulates the line pressure PL from the manual valve 52 (primary regulator valve 51) to generate a C2 solenoid pressure Pslc2 for the clutch C2, and a B1 linear solenoid valve (pressure regulation valve) SLB1 that regulates the line pressure PL from the manual valve 52 (primary regulator valve 51) to generate a B1 solenoid pressure Pslb1 for the brake B1. The hydraulic pressure necessary for the fluid transmission apparatus 23 and the automatic transmission 30 is calculated from the state of the automatic transmission 30 (whether or not during shifting), torque of the engine 12 serving as a motor, the vehicle speed, the throttle operation amount, the oil temperature, etc.

Further, the hydraulic control device 50 according to the embodiment includes a switching valve 53 capable of selectively supplying the C2 solenoid pressure Pslc2 from the C2 linear solenoid valve SLC2 to the clutch C2 and the brake B3, and a shuttle valve (maximum pressure selection valve) 54 that is connected to respective output ports of the linear solenoid valves SLC1, SLC2, and SLB1 and that outputs a maximum pressure Pmax that is the highest of the C1 solenoid pressure Pslc1, the C2 solenoid pressure Pslc2, and the B1 solenoid pressure Pslb1.

The primary regulator valve 51 receives as a signal pressure the maximum pressure Pmax from the shuttle valve 54 discussed above to generate the line pressure PL corresponding to the maximum pressure Pmax. It should be noted, however, that the primary regulator valve 51 may be driven by a control pressure from a linear solenoid valve (not shown) that regulates the pressure of hydraulic oil from the oil pump 29 side (for example, a modulator valve that regulates the line pressure PL to output a constant hydraulic pressure) in accordance with the accelerator operation amount Acc or the operation amount of the throttle valve to output the control pressure.

The manual valve 52 includes a spool that is axially slidable in conjunction with the shift lever 95, an input port to which the line pressure PL is supplied, a drive range output port that communicates with respective input ports of the C1 linear solenoid valve SLC1, the C2 linear solenoid valve SLC2, and the B1 linear solenoid valve SLB1 via an oil passage, a reverse range output port that communicates with a hydraulic pressure entrance of the clutch C3 via an oil passage, and so forth. When a driver selects a forward travel shift range (such as a drive range), the spool of the manual valve 52 allows the input port to communicate with only the drive range output port so that the line pressure PL is supplied to the C1 linear solenoid valve SLC1, the C2 linear solenoid valve SLC2, and the B1 linear solenoid valve SLB1. When the driver selects the reverse range for reverse travel, meanwhile, the spool of the manual valve 52 allows the input port to communicate with only the reverse range output port so that the line pressure PL is supplied to the clutch C3. When the driver selects the parking range or the neutral range, further, the spool of the manual valve 52 blocks communication between the input port and the drive range output port and the reverse range output port.

The C1 linear solenoid valve SLC1 is a normally open linear solenoid valve that regulates the line pressure PL from the manual valve 52 in accordance with the value of a current applied from an auxiliary battery (not shown) to generate the C1 solenoid pressure Pslc1 to be supplied to the clutch C1. The C2 linear solenoid valve SLC2 is a normally open linear solenoid valve that regulates the line pressure PL from the manual valve 52 in accordance with the value of a current applied from the auxiliary battery (not shown) to generate the C2 solenoid pressure Pslc2 to be supplied to the clutch C2. The B1 linear solenoid valve SLB1 is a normally closed linear solenoid valve that regulates the line pressure PL from the manual valve 52 in accordance with the value of a current applied from the auxiliary battery (not shown) to generate the B1 solenoid pressure Pslb1 to be supplied to the brake B1. In the embodiment, from the viewpoint of the cost and the ease of design, the linear solenoid valves SLC1, SLC2, and SLB1 have the same size and the same maximum output pressure. The linear solenoid valves SLC1, SLC2, and SLB1 (respective currents applied thereto) are controlled by the speed change ECU 21 such that a shift speed corresponding to the accelerator operation amount Acc (or the operation amount of the throttle valve) and the vehicle speed V acquired from a speed change line diagram (not shown) determined in advance is established by engaging and disengaging the clutches C1 to C3 and the brake B1.

Next, procedures for controlling linear solenoid valves corresponding to two of the clutches C1 and C2 and the brake B1 engaged concurrently with each other when the two clutches etc. are engaged concurrently with each other, that is, when one of the second speed, the third speed, and the fourth speed is established in the automatic transmission 30, will be described with reference to FIGS. 6 to 8. FIG. 6 is a flowchart showing an example of a hydraulic pressure control routine executed by the speed change ECU 21 repeatedly at intervals of a predetermined time when two of the clutches C1 and C2 and the brake B1 are engaged concurrently with each other.

To start the routine of FIG. 6, the CPU (not shown) of the speed change ECU 21 executes a process for inputting data necessary for control such as a current shift speed $\gamma$ of the automatic transmission 30 and engine torque Te which is an estimated value of input torque input to the input shaft 31 of the automatic transmission 30, that is, torque output from the engine 12 (step S100). The current shift speed $\gamma$ corresponds to the accelerator operation amount Acc and the vehicle speed V acquired from the speed change line diagram discussed above. Here, the current shift speed $\gamma$ is one of the second speed, the third speed, and the fourth speed as discussed above. In the following, for simplicity, the routine will be described with the current shift speed $\gamma$ defined as the third speed which is established through concurrent engagement of the clutches C1 and C2 as appropriate. The engine torque Te is calculated by the engine ECU 14 on the basis of the rotational speed of the engine 12, the intake air amount of the engine 12 detected by an air flow meter (not shown) or the operation amount of the throttle valve, and a map or calculation formula determined in advance, and input from the engine ECU 14 through communication.

After the data input process in step S100, the speed change ECU 21 acquires respective torque distribution ratios of the two clutches etc. engaged concurrently with each other on the basis of the input current shift speed $\gamma$ (step S110). The torque distribution ratios indicate the ratio of torque to be transferred by a clutch or a brake that is engaged to establish a certain shift speed to the engine torque Te (input torque). In the embodiment, a torque distribution ratio map such as that illustrated in FIG. 7 that prescribes the respective torque distribution ratios of the clutches and the brakes that are engaged to establish each shift speed in the automatic transmission 30 has been prepared in advance (with "R1c1" etc. in FIG. 7 each indicating a positive real number). In step S110, the respective torque distribution ratios of the two clutches etc. which establish the current shift speed γ (in the case where the current shift speed γ is the third speed, the torque distribution ratio R3c1 of the clutch C1 and the torque distribution ratio R3c2 of the clutch C2) are acquired from the torque distribution ratio map. Further, the speed change ECU 21 calculates respective distributed torques for the two clutches etc. engaged concurrently with each other by multiplying the torque distribution ratios acquired in step S110 by the engine torque Te (step S120). That is, in the case where the current shift speed γ is the third speed, the distributed torque for the clutch C1 is Tc1=TexR3c1, and the distributed torque for the clutch C2 is Tc2=TexR3c2.

Next, the speed change ECU 21 determines one of the two clutches etc. engaged concurrently with each other at that time as an abnormal-time engagement element, and determines the other of the two clutches etc. as an abnormal-time slipping element (step S130). The abnormal-time engagement element is kept engaged when an abnormality occurs in which one different clutch or brake is engaged through direct supply of the line pressure PL to the one different brake etc. because of a linear solenoid valve being stuck open, an abnormality in energization, or the like during concurrent engagement of the two clutches etc. The abnormal-time slipping element is caused to slip when such an abnormality occurs. In the embodiment, for the second speed and the third speed of the automatic transmission 30, one of the two clutches etc. engaged concurrently with each other that is to be engaged concurrently with the one different clutch or brake that is to be engaged because of occurrence of the abnormality described above when a shift speed that is one speed higher than the current shift speed γ is established is determined in advance as the abnormal-time engagement element, and the other is determined in advance as the abnormal-time slipping element. In the case where the current shift speed γ is the highest shift speed, that is, the fourth speed, the clutch C2 which is engaged concurrently with the one different clutch C1 to establish the third speed which is one speed lower than the fourth speed is determined in advance as the abnormal-time engagement element, and the brake Bi is determined in advance as the abnormal-time slipping element. Consequently, the abnormal-time engagement element and the abnormal-time slipping element are decided so as to establish a shift speed that is higher (one speed higher) than the shift speed to be established through concurrent engagement of the two clutches etc. corresponding to the current shift speed γ where possible (except when the highest shift speed is established), and so as not to establish a shift speed that is two speeds or more lower than the shift speed to be established through concurrent engagement of the two clutches etc.

Thus, in step S130 of the embodiment, in the case where the current shift speed γ is the second speed which is established through concurrent engagement of the clutch C1 and the brake B1, the clutch C1, which is engaged concurrently with the one different clutch C2 to establish the third speed which is one speed higher than the second speed, is determined as the abnormal-time engagement element, and the brake B1 is determined as the abnormal-time slipping element. In the case where the current shift speed γ is the third speed which is established through concurrent engagement of the clutch C1 and the clutch C2, meanwhile, the clutch C2, which is engaged concurrently with the one different brake B1 to establish the fourth speed which is one speed higher than the third speed, is determined as the abnormal-time engagement element, and the clutch C1 is determined as the abnormal-time slipping element. In the case where the current shift speed γ is the fourth speed which is established through concurrent engagement of the clutch C2 and the brake B1, further, the clutch C2, which is engaged concurrently with the one different clutch C1 to establish the third speed which is one speed lower than the fourth speed, is determined as the abnormal-time engagement element, and the brake B1 is determined as the abnormal-time slipping element.

When the abnormal-time engagement element and the abnormal-time slipping element are thus decided, the speed change ECU 21 sets a target hydraulic pressure (target value) for the hydraulic pressure to be supplied to the abnormal-time slipping element (step S140). That is, in step S140, in the case where the current shift speed γ is the third speed, the speed change ECU 21 sets a target hydraulic pressure Pslc1* for the C1 linear solenoid valve SLC1 which supplies the C1 solenoid pressure Pslc1 to the clutch C1 determined as the abnormal-time slipping element. The target hydraulic pressure for the abnormal-time slipping element is set by converting the product of the distributed torque for the abnormal-time slipping element set in step S120 and a safety factor α determined in advance (in the case where the current shift speed γ is the third speed, Tc1×α) into a hydraulic pressure matching the specifications etc. of the abnormal-time slipping element (in the case where the current shift speed γ is the third speed, the clutch C1).

Further, the speed change ECU 21 sets a target hydraulic pressure (target value) for the hydraulic pressure to be supplied to the abnormal-time engagement element (step S150) in consideration of the target hydraulic pressure for the abnormal-time slipping element set in step S140. That is, in step S150, in the case where the current shift speed γ is the third speed, the speed change ECU 21 sets a target hydraulic pressure Pslc2* for the C2 linear solenoid valve SLC2 which supplies the C2 solenoid pressure Pslc2 to the clutch C2 determined as the abnormal-time engagement element. The target hydraulic pressure for the abnormal-time engagement element is set by converting the sum of the product of the distributed torque for the abnormal-time engagement element set in step S120 and the safety factor α determined in advance, a value obtained by multiplying the product of the distributed torque for the abnormal-time slipping element and the safety factor α by a coefficient k determined in advance, and a margin Tm determined in advance (in the case where the current shift speed γ is the third speed, Tc2×α+Tc1×α×k+Tm) into a hydraulic pressure matching the specifications etc. of the abnormal-time engagement element (in the case where the current shift speed γ is the third speed, the clutch C2). Consequently, in the case where the current shift speed γ is the third speed, the target hydraulic pressure Pslc2* for the C2 linear solenoid valve SLC2 corresponding to the clutch C2 determined as the abnormal-time engagement element is set to be higher than the target hydraulic pressure Ps1c1* for the C1 linear solenoid valve SLC1 corresponding to the clutch C1 determined as the abnormal-time slipping element.

Then, the speed change ECU 21 controls the linear solenoid valves (the C1 linear solenoid valve SLC1 and the C2 linear solenoid valve SLC2) corresponding to the two clutches etc. engaged concurrently with each other (step S160) such that the hydraulic pressure to be supplied to the abnormal-time slipping element (in the case where the current shift speed γ is the third speed, the C1 solenoid pressure Pslc1 to be supplied to the clutch C1) reaches the target hydraulic pressure (Pslc1*) set in step S140, and such that the hydraulic pressure to be supplied to the abnormal-time engagement element (in the case where the current shift speed γ is the third speed, the C2 solenoid pressure Pslc2 to be supplied to the clutch C2) reaches the target hydraulic pressure (Pslc2*) set in step S150. The speed change ECU 21 executes the processes in and after step S100 again. Consequently, in the case where the current shift speed γ is the third speed, the clutch C1 determined as the abnormal-time slipping element is supplied with a hydraulic pressure matching the distributed torque Tc1 based on the engine torque Te which is input torque for the automatic transmission 30 and the torque distribution ratio R3c1 determined in advance, and the clutch C2 determined as the abnormal-time engagement element is supplied with a hydraulic pressure obtained by raising on the basis of the distributed torque Tc1 for the clutch C1 a hydraulic pressure matching the distributed torque Tc2 based on the engine torque Te and the torque distribution ratio R3c2 determined in advance.

Figure 8:
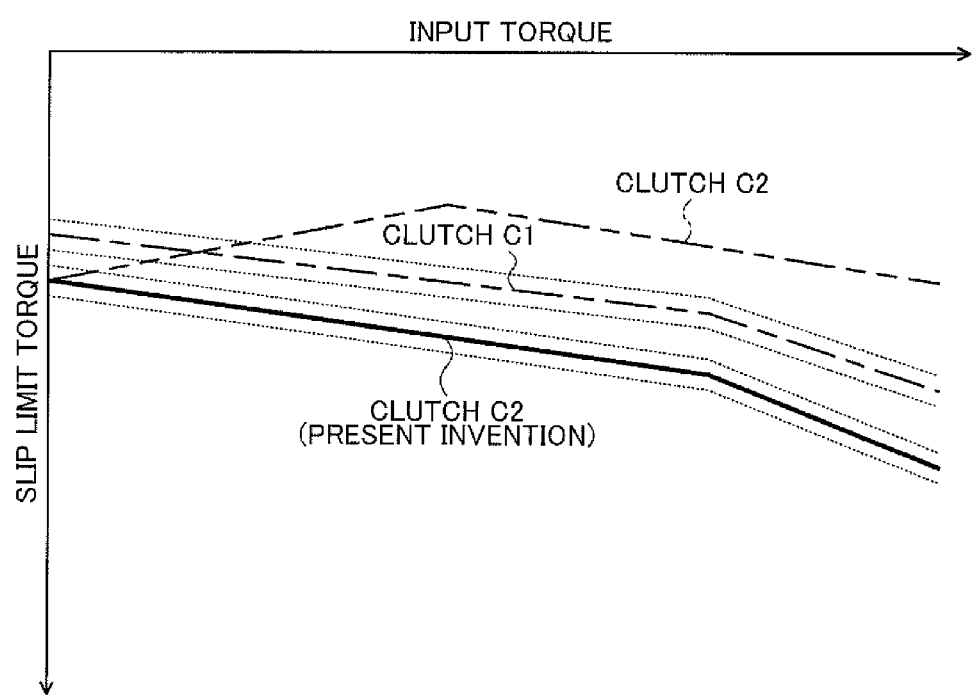
FIG. 8 illustrates slip limit torque for an abnormal-time slipping element and an abnormal-time engagement element at the time when an abnormality occurs in which one different clutch or brake is engaged with two clutches etc. engaged concurrently with each other.

Here, in the automatic transmission 30 according to the embodiment, as shown in FIG. 8, slip limit torque at which the clutch C2 is caused to slip when an abnormality occurs in which the one different brake B1 is engaged with the third speed established in the automatic transmission 30 through concurrent engagement of the clutches C1 and C2 (see the dash-double-dot line in the drawing) is lower than slip limit torque at which the clutch C1 is caused to slip when such an abnormality occurs (see the dash-and-dot line in the drawing). In the automatic transmission 30 having such characteristics, if the clutch C1 determined as the abnormal-time slipping element is supplied with a hydraulic pressure matching the distributed torque Tc1 described above and the clutch C2 determined as the abnormal-time engagement element is supplied with a hydraulic pressure obtained by raising a hydraulic pressure matching the distributed torque Tc2 described above on the basis of the distributed torque Tc1 for the clutch C1 determined as the abnormal-time slipping element, the slip limit torque for the clutch C2 can be made higher than the slip limit torque for the clutch C1 as indicated by the thick solid line in FIG. 8 while maintaining the slip limit torque for the clutch C1 maintained as indicated by the dash-and-dot line in the drawing. The margin used to set the target hydraulic pressure for the abnormal-time engagement element in step S150 is determined in consideration of variations in slip limit torque for the clutch C1 (see the dotted lines in the drawing) and variations in slip limit torque for the clutch C2 (see the dotted lines in the drawing) caused when the clutch C2 is supplied with the hydraulic pressure raised on the basis of the distributed torque Tc1 for the clutch C1 as shown in FIG. 8.

In the automatic transmission 30 included in the power transfer device 20 according to the embodiment, as has been described above, one of the two clutches etc. engaged concurrently with each other to establish the second speed, the third speed, or the fourth speed (highest shift speed) is determined in advance as the abnormal-time engagement element which is kept engaged when an abnormality occurs in which one different clutch or brake is engaged during concurrent engagement of the two clutches etc., and the other of the two clutches etc. is determined in advance as the abnormal-time slipping element which is caused to slip when such an abnormality occurs. Then, during concurrent engagement of the two clutches etc., the hydraulic pressure (target hydraulic pressure) to be supplied to the abnormal-time engagement element is set to be higher than the hydraulic pressure (target hydraulic pressure) to be supplied to the abnormal-time slipping element (steps S140 and S150 in FIG. 6). That is, during concurrent engagement of the two clutches etc., the target hydraulic pressures for the linear solenoid valves corresponding to the two clutches etc. are set such that the two clutches etc. are not caused to slip, and such that the abnormal-time engagement element is caused to slip when an abnormality occurs. Consequently, the abnormal-time slipping element can be quickly caused to slip and the abnormal-time engagement element can be more reliably kept engaged when an abnormality occurs in which one different clutch or brake is engaged during concurrent engagement of the two clutches etc. Thus, it is possible to more reliably establish a shift speed through concurrent engagement of the abnormal-time engagement element and the one different clutch or brake after the abnormality described above occurs. Thus, with the power transfer device 20 according to the embodiment, the automatic transmission 30 can be brought into a more adequate state when an abnormality occurs in which the one different clutch or brake is engaged during concurrent engagement of the two clutches etc.

In addition, when an abnormality occurs in which one different clutch or brake is engaged with the second speed or the third speed established in the automatic transmission 30 through concurrent engagement of the two clutches etc., a shift speed (the third speed or the fourth speed) that is one speed higher than the shift speed (the second speed or the third speed) established through concurrent engagement of the two clutches etc. is established by the abnormal-time engagement element and the one different clutch or brake. Thus, it is possible to suppress a change in shift speed toward the lower speed side (downshift side), that is, output of braking torque to the output shaft 37 of the automatic transmission 30, when the abnormality described above occurs, thereby favorably suppressing an abrupt increase in rotational speed of the engine 12 coupled to the automatic transmission 30. That is, in the embodiment described above, in the case where the current shift speedy is the third speed, the clutch C2 is determined as the abnormal-time engagement element, and the clutch C1 is determined as the abnormal-time slipping element. Thus, even if an abnormality occurs in which the brake B1 is engaged through direct supply of the line pressure PL, it is possible to establish the fourth speed which is one speed higher than the current shift speed γ through concurrent engagement of the clutch C2 and the brake B1, and to suppress establishment of the second speed which is one speed lower than the current shift speed γ through concurrent engagement of the clutch C1 and the brake B1. Further, when an abnormality occurs in which the clutch C1 is engaged with the fourth speed which is the highest shift speed established in the automatic transmission 30 through concurrent engagement of the clutch C2 and the brake B1, the third speed which is one speed lower than the highest shift speed is established by the clutch C2 determined as the abnormal-time engagement element and the one different clutch C1. Thus, it is possible to suppress a change in shift speed toward the lower speed side (downshift side), that is, output of high braking torque to the output shaft 37 of the automatic transmission 30, when the abnormality described above occurs, thereby suppressing an abrupt increase in rotational speed of the engine 12 coupled to the automatic transmission 30. That is, in the embodiment described above, in the case where the current shift speed γ is the fourth speed, the clutch C2 is determined as the abnormal-time engagement element, and the brake B1 is determined as the abnormal-time slipping element. Thus, even if an abnormality occurs in which the clutch C1 is engaged through direct supply of the line pressure PL, it is possible to establish the third speed which is one speed lower than the current shift speed γ through concurrent engagement of the clutch C1 and the clutch C2, and to suppress establishment of the second speed which is two speeds lower than the current shift speed γ through concurrent engagement of the clutch C1 and the brake B1.

In this way, in the embodiment described above, the abnormal-time engagement element and the abnormal-time slipping element are decided so as to establish a shift speed that is higher (in the embodiment, one speed higher) than the shift speed to be established through concurrent engagement of the two clutches etc. corresponding to the current shift speed γ where possible (except when the highest shift speed is established), and so as not to establish a shift speed that is a predetermined number of speeds or more (in the embodiment, two speeds or more) lower than the shift speed to be established through concurrent engagement of the two clutches etc. (step S130). Consequently, it is possible to suppress occurrence of a steep downshift such as that from the fourth speed to the second speed when the abnormality described above occurs, thereby favorably suppressing an abrupt increase in rotational speed of the engine 12 coupled to the automatic transmission 30.

Then, in the embodiment described above, during engagement of the two clutches etc., the abnormal-time slipping element is supplied with a hydraulic pressure matching the distributed torque based on the engine torque Te which is input torque for the automatic transmission 30 and the torque distribution ratio for the abnormal-time slipping element determined in advance in accordance with the shift speed, and the abnormal-time engagement element is supplied with a hydraulic pressure obtained by raising on the basis of the distributed torque for the abnormal-time slipping element a hydraulic pressure matching the distributed torque based on the engine torque Te and the torque distribution ratio for the abnormal-time engagement element determined in advance in accordance with the shift speed. Consequently, during concurrent engagement of the two clutches etc., it is possible to more adequately set the respective hydraulic pressures to be supplied to the two clutches etc. such that the slip limit torque for the abnormal-time engagement element becomes higher than the slip limit torque for the abnormal-time slipping element.

Figures 9, 10:
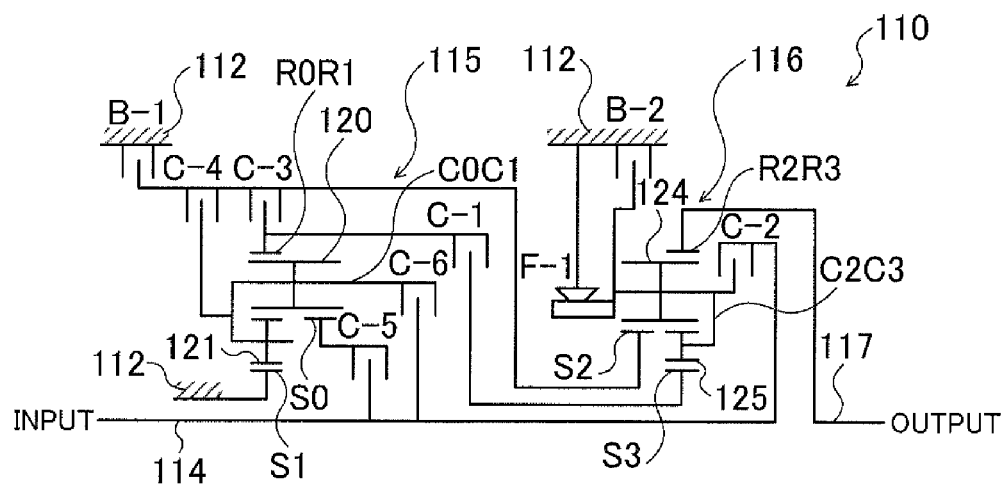
FIG. 9 shows a schematic configuration of an automatic transmission 110 according to a modification.
FIG. 10 is an operation table showing the relationship between each shift speed of the automatic transmission 110 and the respective operating states of clutches and brakes.

In the automatic transmission 30 discussed above, two of three or more (five) clutches and brakes are engaged concurrently with each other to establish a plurality of shift speeds. However, application of the present invention is not limited thereto. That is, the present invention may be applied to speed change devices in which three or more of a plurality of clutches and brakes are engaged concurrently with each other to establish a plurality of shift speeds. FIG. 9 shows an automatic transmission 110 according to a modification which is an example of such transmissions.

The automatic transmission 110 shown in FIG. 9 includes an input shaft 114 connected to an engine serving as a motor via a starting device (not shown), a speed-reducing composite (Ravigneaux type) planetary gear 115, a speed-changing composite (Ravigneaux type) planetary gear 116, an output shaft 117 connected to drive wheels via a differential mechanism (not shown) etc., clutches C-1, C-2, C-3, C-4, C-5, and C-6, brakes B-1 and B-2, a one-way clutch F-1, etc. The speed-reducing composite planetary gear 115 includes a speed-reducing common carrier C0C1 that rotatably supports a long pinion gear 120 and a pinion gear 121 meshed with each other, a first sun gear S0 meshed with the long pinion gear 120, a second sun gear S1 meshed with the pinion gear 121, and a speed-reducing common ring gear R0R1 meshed with the long pinion gear 120. The speed-changing composite planetary gear 116 includes a speed-changing common carrier C2C3 that rotatably supports a long pinion gear 124 and a pinion gear 125 meshed with each other, a third sun gear S2 meshed with the long pinion gear 124, a fourth sun gear S3 meshed with the pinion gear 125, and a speed-changing common ring gear R2R3 meshed with the long pinion gear 124.

In the speed-reducing composite planetary gear 115, the first sun gear S0 can be coupled to the input shaft 114 via the clutch C-5, and the second sun gear S1 is held stationary with respect to a transmission case 112. In addition, the speed-reducing common carrier C0C1 can be coupled to the input shaft 114 via the clutch C-6. The third sun gear S2 of the speed-changing composite planetary gear 116 is selectively coupled to the speed-reducing common carrier C0C1 of the speed-reducing composite planetary gear 115 via the clutch C-4, selectively coupled to the speed-reducing common ring gear R0R1 via the clutch C-3, and selectively held stationary via the brake B-1. The speed-changing common carrier C2C3 is selectively coupled to the input shaft 114 via the clutch C-2, selectively held stationary via the brake B-2, and coupled to the transmission case 112 via the one-way clutch F-1, which is disposed in parallel with the brake B-2, so as not to rotate in reverse. The fourth sun gear S3 is selectively coupled to the speed-reducing common ring gear R0R1 via the clutch C-1. The speed-changing common ring gear R2R3 is directly coupled to the output shaft 117.

Figure 11:
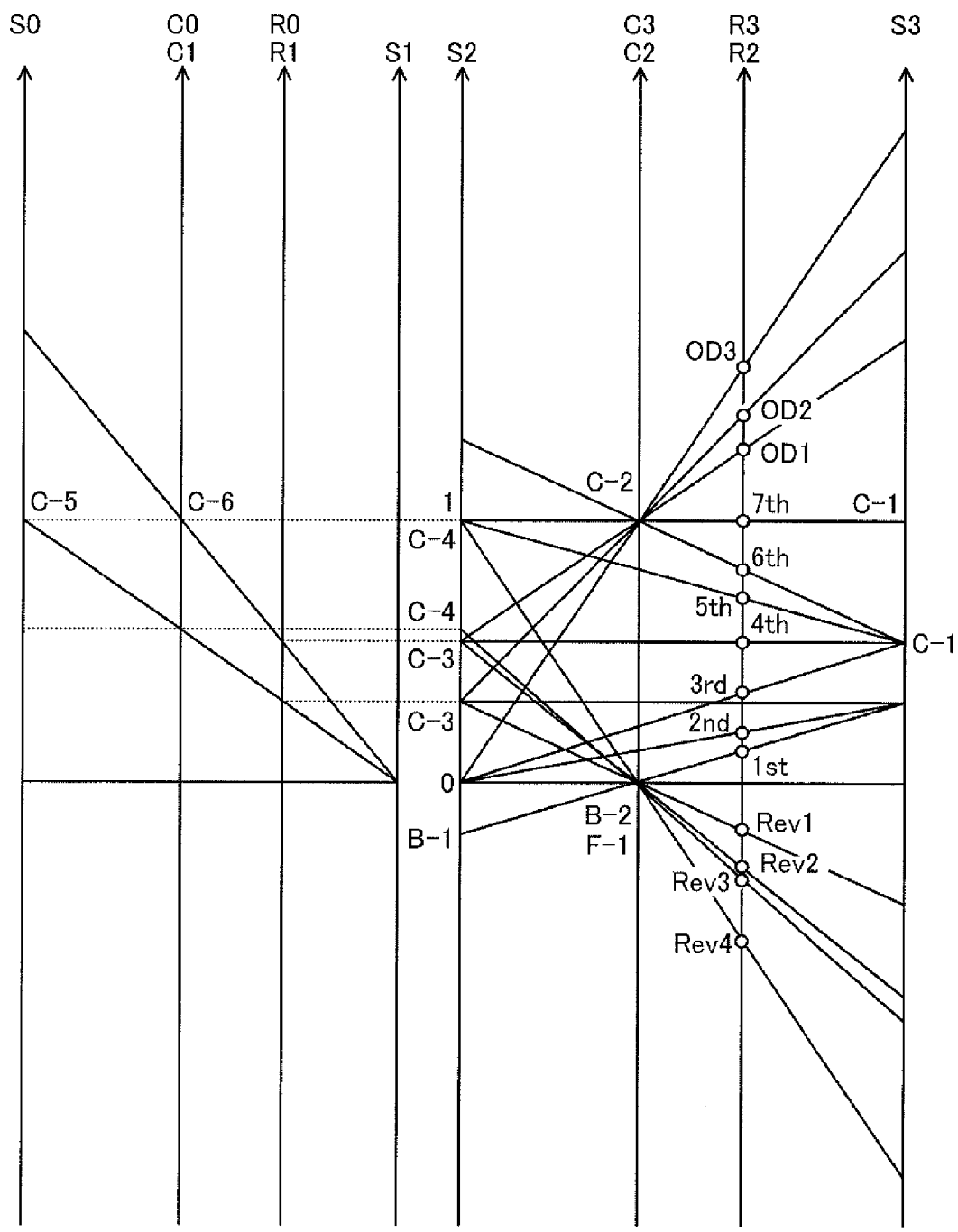
FIG. 11 is a collinear diagram illustrating the relationship between the respective rotational speeds of rotary elements forming the automatic transmission 110.

FIG. 10 is an operation table showing the relationship between each shift speed of the automatic transmission 110 and the respective operating states of the clutches C-1 to C-6, the brakes B-1 and B-2, and the one-way clutch F-1. FIG. 11 is a collinear diagram illustrating the relationship between the respective rotational speeds of rotary elements forming the automatic transmission 110. The automatic transmission 110 provides ten forward speeds (first to seventh speeds and shift speeds OD1, OD2, and OD3) and four reverse speeds by bringing the clutches C-1 to C-6 and the brakes B-1 and B-2 into the states shown in the operation table of FIG. 10, that is, engaging three of the plurality of (three or more) clutches C-1 to C-6 and brakes B-1 and B-2 concurrently with each other. In FIG. 10, the symbol "0" indicates "engaged", the symbol "." indicates "engaged with engine brake in operation", and the symbol "(○)" indicates "supplied with a hydraulic pressure in preparation for shifting but transferring no torque".

In the automatic transmission 110 configured as discussed above, when a hydraulic pressure control routine similar to that in FIG. 6 is executed, the abnormal-time engagement element and the abnormal-time slipping element at the current shift speed γ are decided as shown in FIG. 12 in a process corresponding to step S130 described above. Consequently, in the case where the current shift speed γ is the sixth speed, for example, the clutches C-2 and C-6 are determined as the abnormal-time engagement element, and the clutch C-1 is determined as the abnormal-time slipping element. Thus, even if an abnormality occurs in which the clutch C-3 is engaged through direct supply of the line pressure PL, it is possible to establish the shift speed OD1 which is two speeds higher than the current shift speed γ through concurrent engagement of the clutches C-2, C-3, and C-6, and to suppress establishment of the fourth speed which is two speeds lower than the current shift speed γ through concurrent engagement of the clutches C-1, C-3, and C-6. In this way, also in the automatic transmission 110, the abnormal-time engagement element and the abnormal-time slipping element are decided so as to establish a shift speed that is higher (one speed or more higher) than the shift speed to be established through concurrent engagement of three clutches etc. where possible (except when the highest shift speed is established), and so as not to establish a shift speed that is two speeds or more lower than the shift speed to be established through concurrent engagement of the three clutches etc. Thus, it is possible to suppress occurrence of a steep downshift such as that from the sixth speed to the fourth speed, that is, output of high braking torque to the output shaft 37 of the automatic transmission 30, when the abnormality discussed above occurs, thereby favorably suppressing an abrupt increase in rotational speed of the engine serving as a motor coupled to the automatic transmission 110.

The abnormality in which at least one clutch etc. (friction engagement element) other than two or more clutches etc. (friction engagement elements) during concurrent engagement of the two or more clutches etc. is not limited to the abnormality discussed above in which at least one different clutch etc. is engaged through direct supply of the line pressure PL to the at least one different clutch etc. because of a linear solenoid valve being stuck open, an abnormality in energization, or the like during concurrent engagement of the two or more clutches etc. That is, the abnormality to which the present invention pertains may be of any type as long as at least one clutch etc. (friction engagement element) other than two or more clutches etc. (friction engagement elements) is engaged during concurrent engagement of the two or more clutches etc., such as an abnormality in which the one clutch etc. is engaged through supply of a hydraulic pressure other than the line pressure, for example. In addition, the abnormal-time engagement element and the abnormal-time slipping element may be decided so as to establish a shift speed that is two speeds or more higher than the shift speed to be established through concurrent engagement of the two clutches etc. corresponding to the current shift speed where possible (except when the highest shift speed is established), or the abnormal-time engagement element and the abnormal-time slipping element may be decided so as not to establish a shift speed that is three speeds or more, for example, lower than the shift speed to be established through concurrent engagement of the two clutches etc., depending on the configuration of the speed change device and the number of shift speeds.

Here, the correspondence between the main elements of the embodiment and the main elements of the invention described in the "SUMMARY OF THE INVENTION" section will be described. That is, in the embodiment described above, the automatic transmission 30 having the clutches C1 and C2 and the brake B1 and capable of establishing the second speed, the third speed, and the fourth speed by engaging two of the clutches C1 and C2 and the brake B1 concurrently with each other corresponds to the "speed change mechanism". The C1 linear solenoid valve SLC1, the C2 linear solenoid valve SLC2, and the B1 linear solenoid valve SLB1 which each regulate the line pressure PL on the basis of the target hydraulic pressure to supply a hydraulic pressure to the corresponding one of the clutches C1 and C2 and the brake B1 correspond to the "pressure regulation valve". The speed change ECU 21 which executes the processes in steps S130 and S140 in FIG. 6 corresponds to the "decision unit". The speed change ECU 21 which executes the process in step S150 in FIG. 6 corresponds to the "target hydraulic pressure setting unit". The correspondence between the main elements of the embodiment etc. and the main elements of the invention described in the "SUMMARY OF THE INVENTION" section does not limit the elements of the invention described in the "SUMMARY OF THE INVENTION" section, because the embodiment etc. are examples given for the purpose of specifically describing the invention described in the "SUMMARY OF THE INVENTION" section. That is, the embodiment etc. are merely specific examples of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

The present invention can be utilized in the speed change device manufacturing industry.

The invention claimed is:

1. A control device for a speed change device including a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, the control device configured to:

determine a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs;

set respective target hydraulic pressures for pressure regulation valves corresponding to the two or more friction engagement elements on the basis of input torque for the speed change mechanism and a torque distribution ratio determined in advance such that the two or more friction engagement elements are not caused to slip with the shift speed established through engagement of the two or more friction engagement elements and such that the abnormal-time slipping element is caused to slip when the abnormality occurs; and set respective target hydraulic pressures for the pressure regulation valves corresponding to the two or more friction engagement elements such that the abnormal-time slipping element is supplied with a hydraulic pressure matching distributed torque based on the input torque and a torque distribution ratio for the abnormal-time slipping element determined in advance in accordance with the shift speed, and such that the abnormal-time engagement element is supplied with a hydraulic pressure obtained by raising on the basis of the distributed torque for the abnormal-time slipping element a hydraulic pressure matching distributed torque based on the input torque and a torque distribution ratio for the abnormal-time engagement element determined in advance in accordance with the shift speed wherein the abnormal-time engagement element and the abnormal-time slipping element are selected so as to establish a shift speed that is higher than the shift speed established through concurrent engagement of the two or more friction engagement elements.

2. The control device for a speed change device according to claim 1, wherein the controller decides the abnormal-time engagement element and the abnormal-time slipping element such that a shift speed that is one speed higher than the shift speed established through concurrent engagement of the two or more friction engagement elements is established by the abnormal-time engagement element and at least one friction engagement element other than the two or more friction engagement elements when the abnormality occurs.

3. The control device for a speed change device according to claim 1, wherein
the controller decides the abnormal-time engagement element and the abnormal-time slipping element such that a shift speed that is one speed lower than a highest shift speed is established by the abnormal-time engagement element and at least one friction engagement element other than the two or more friction engagement elements when the abnormality occurs with the highest shift speed established through concurrent engagement of the two or more friction engagement elements.

4. A control device for a speed change device including a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, the control device configured to:
determine a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs;
set respective target hydraulic pressures for pressure regulation valves corresponding to the two or more friction engagement elements on the basis of input torque for the speed change mechanism and a torque distribution ratio determined in advance such that the two or more friction engagement elements are not caused to slip with the shift speed established through engagement of the two or more friction engagement elements and such that the abnormal-time slipping element is caused to slip when the abnormality occurs; and
set respective target hydraulic pressures for the pressure regulation valves corresponding to the two or more friction engagement elements such that the abnormal-time slipping element is supplied with a hydraulic pressure matching distributed torque based on the input torque and a torque distribution ratio for the abnormal-time slipping element determined in advance in accordance with the shift speed, and such that the abnormal-time engagement element is supplied with a hydraulic pressure obtained by raising on the basis of the distributed torque for the abnormal-time slipping element a hydraulic pressure matching distributed torque based on the input torque and a torque distribution ratio for the abnormal-time engagement element determined in advance in accordance with the shift speed wherein
the abnormal-time engagement element and the the abnormal-time slipping element are selected so as not to establish a shift speed that is a predetermined number of shift speeds or more lower than the shift speed established through concurrent engagement of the two or more friction engagement elements.

5. The control device for a speed change device according to claim 4, wherein
the controller decides the abnormal-time engagement element and the abnormal-time slipping element such that a shift speed that is higher than the shift speed established through concurrent engagement of the two or more friction engagement elements is established by the abnormal-time engagement element and at least one friction engagement element other than the two or more friction engagement elements when the abnormality occurs.

6. The control device for a speed change device according to claim 4, wherein
the controller decides the abnormal-time engagement element and the abnormal-time slipping element such that a shift speed that is one speed lower than a highest shift speed is established by the abnormal-time engagement element and at least one friction engagement element other than the two or more friction engagement elements when the abnormality occurs with the highest shift speed established through concurrent engagement of the two or more friction engagement elements.

7. A control method for a speed change device including a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, the control method implemented by a controller to perform the following steps:
a step (a) of determining a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs; and
a step (b) of setting respective target hydraulic pressures for pressure regulation valves corresponding to the two or more friction engagement elements on the basis of input torque for the speed change mechanism and a torque distribution ratio determined in advance such that the two or more friction engagement elements are not caused to slip with the shift speed established through engagement of the two or more friction engagement elements and such that the abnormal-time slipping element is caused to slip when the abnormality occurs, wherein
the step (b) includes setting respective target hydraulic pressures for the pressure regulation valves corresponding to the two or more friction engagement elements such that the abnormal-time slipping element is supplied with a hydraulic pressure matching distributed torque based on the input torque and a torque distribution ratio for the abnormal-time slipping element determined in advance in accordance with the shift speed, and such that the abnormal-time engagement element is supplied with a hydraulic pressure obtained by raising on the basis of the distributed torque for the abnormal-time slipping element a hydraulic pressure matching distributed torque based on the input torque and a torque distribution ratio for the abnormal-time engagement element determined in advance in accordance with the speed, and the step (a) includes deciding the abnormal-time engagement element and the abnormal-time slipping element so as to establish a shift speed that is higher than the shift speed established through concurrent engagement of the two or more friction engagement elements.

8. A control method for a speed change device including a speed change mechanism including at least three or more friction engagement elements and capable of establishing a plurality of shift speeds by engaging two or more of the three or more friction engagement elements concurrently with each other, and a plurality of pressure regulation valves that each regulate a hydraulic pressure for the corresponding friction engagement element on the basis of a target hydraulic pressure, the control method implemented by a controller to perform the following steps:

a step (a) of determining a part of the two or more friction engagement elements engaged concurrently with each other as an abnormal-time engagement element and determining a remainder of the two or more friction engagement elements as an abnormal-time slipping element, the abnormal-time engagement element being kept engaged when an abnormality occurs in which at least one friction engagement element other than the two or more friction engagement elements is engaged during concurrent engagement of the two or more friction engagement elements, and the abnormal-time slipping element being caused to slip when the abnormality occurs; and a step (b) of setting respective target hydraulic pressures for pressure regulation valves corresponding to the two or more friction engagement elements such that the two or more friction engagement elements are not caused to slip with the shift speed established through engagement of the two or more friction engagement elements and such that the abnormal-time slipping element is caused to slip when the abnormality occurs, wherein the step (b) includes setting respective target hydraulic pressures for the pressure regulation valves corresponding to the two or more friction engagement elements such that the abnormal-time slipping element is supplied with a hydraulic pressure matching distributed torque based on the input torque for the speed change mechanism and a torque distribution ratio for the abnormal-time slipping element determined in advance in accordance with the shift speed, and such that the abnormal-time engagement element is supplied with a hydraulic pressure obtained by raising on the basis of the distributed torque for the abnormal-time slipping element a hydraulic pressure matching distributed torque based on the input torque and a torque distribution ratio for the abnormal-time engagement element determined in advance in accordance with the shift speed, and the step (a) includes deciding the abnormal-time engagement element and the abnormal-time slipping element so as not to establish a shift speed that is a predetermined number of shift speeds or more lower than the shift speed established through concurrent engagement of the two or more friction engagement elements.

* * * * *